United States Patent [19]
Hall

[11] 3,860,201
[45] Jan. 14, 1975

[54] HOT AIR BALLOON MANEUVERING VALVE

[76] Inventor: Ralph H. Hall, 1656 Massachusetts Ave., Lexington, Mass. 52173

[22] Filed: Mar. 14, 1973

[21] Appl. No.: 341,093

[52] U.S. Cl. .............................. 244/99, 244/152
[51] Int. Cl. ............................................. B64b 1/62
[58] Field of Search ............ 244/97, 99, 96, 31, 32, 244/33, 145, 152

[56] References Cited
UNITED STATES PATENTS
3,229,932  1/1966  Yost .................................... 244/31
3,534,927  10/1970 Harding .............................. 244/31

Primary Examiner—Robert G. Sheridan
Assistant Examiner—Donald W. Underwood
Attorney, Agent, or Firm—Robert T. Dunn

[57] ABSTRACT

A hot air balloon has a maneuvering slit in the balloon envelope situated to take advantage of the direction of substantially zero stress in the envelope so that the slit tends to remain closed. A flap on each side of the slit extending the length of the slit on the inside of the balloon envelope insures complete closure of the slit, the flaps being forced together by the greater pressure inside the balloon. Spreader lines connect to the inside flaps and connect to an operating line extending inside the balloon through the balloon opening to the pilot below. The pilot draws the operating line to spread the slit and so releases hot air from the balloon to descend.

14 Claims, 7 Drawing Figures

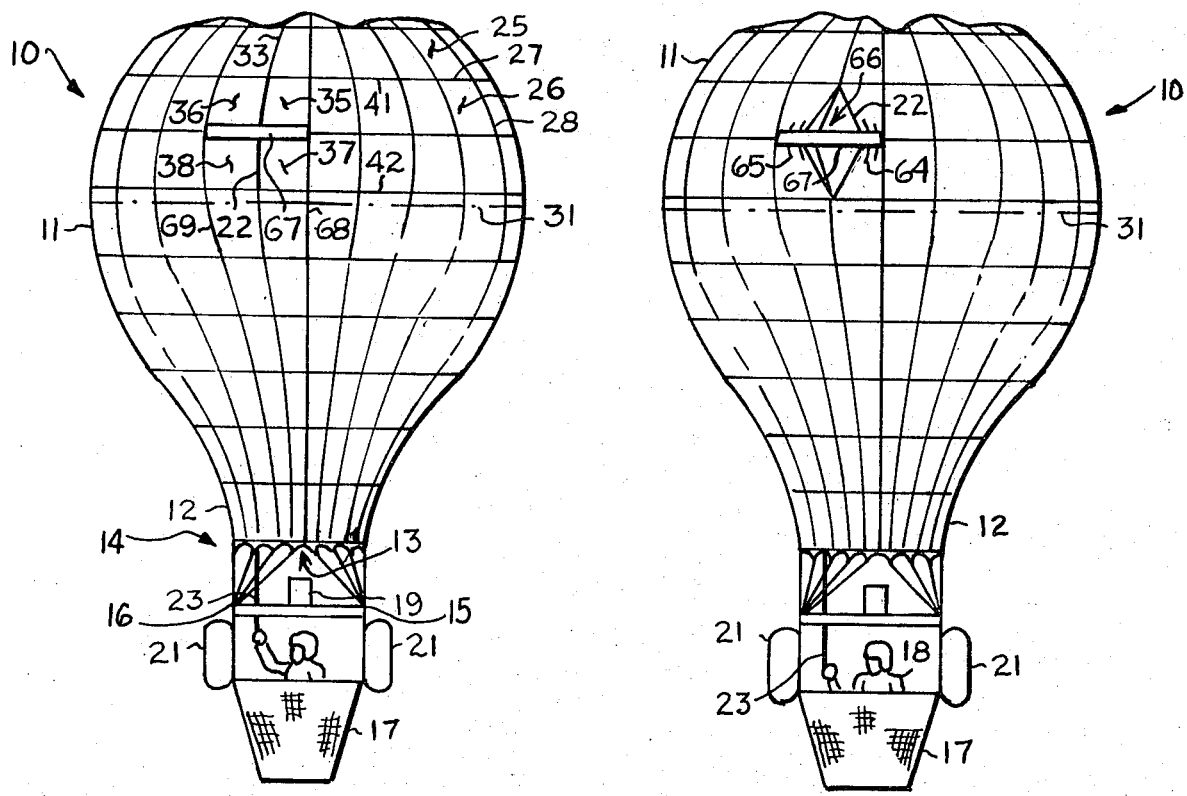
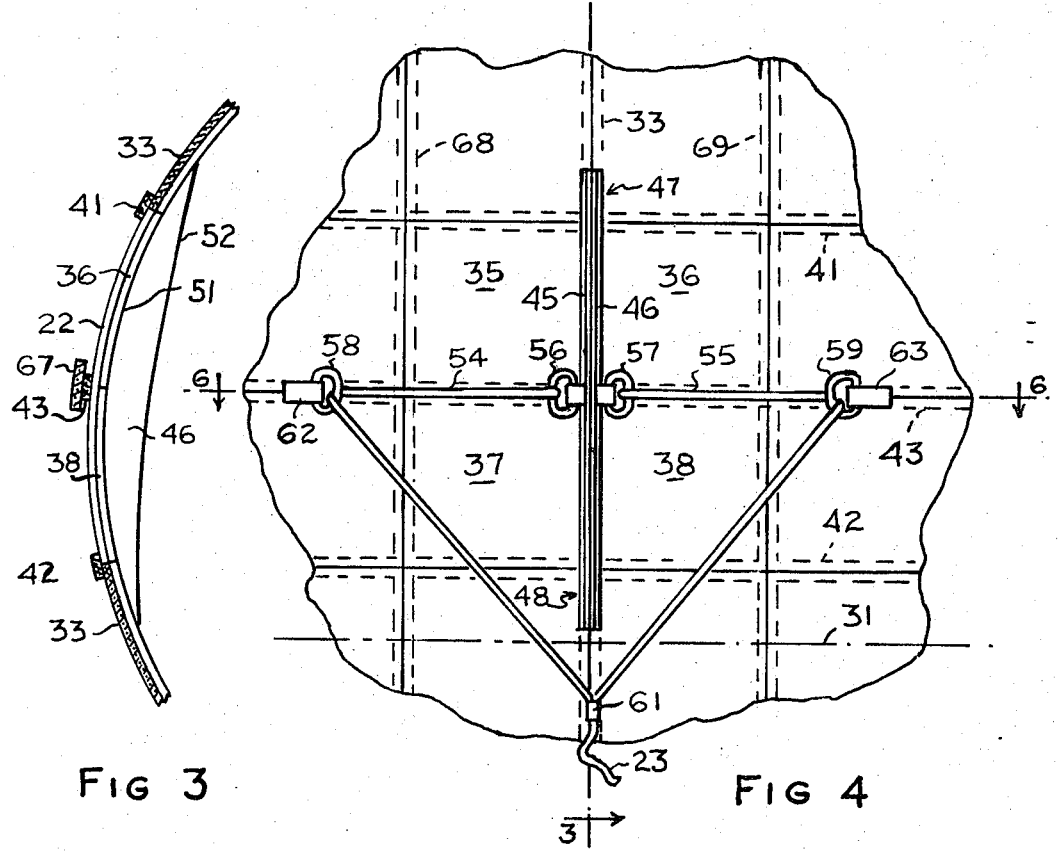

HOT AIR BALLOON MANEUVERING VALVE

BACKGROUND OF THE INVENTION

The present invention relates to hot air balloons and more particularly, to an improved buoyancy lift control for releasing air from the hot air balloon for causing the balloon to descend.

Hot air balloons for manned flight operation have a burner for continually generating hot air that flows upward into the balloon envelope to maintain the balloon aloft. The hot air is produced by gas burner just above the pilot's seat. The burner heats entrained air which flows upward into the balloon envelope just above the burner. When the pilot wishes to land he turns off the burner or turns it to low heat generation. This allows the air in the balloon to cool and render the balloon system less buoyant so that it descends. Heretofore, it has been suggested to provide a vertical slit in the balloon envelope at a location where the natural shape of the balloon envelope has an absence of horizontal stresses and so the slit at this location tends to remain closed. Spreader lines are provided which connect to the sides of the slit and extend by an operating line down to the pilot's position for spreading the slit to release hot air from the balloon and so very quickly render the balloon system less buoyant causing it to descend. This technique has been quite successful and gives the pilot an element of control (descent) which had not been available. However, it has been found that the slit does not close completely, because horizontal stresses are not completely lacking in the balloon envelope and so the slip leaks hot air even when it is closed and this of course, inhibits ascent of the balloon and reduces the efficiency of the balloon system. It is one of the objects of the present invention to provide an improved maneuvering valve for a hot air balloon by which this disadvantage of the present type slit valve is avoided.

Summary of the Invention

In accordance with one embodiment of the present invention, a maneuvering valve in the envelope of a hot air balloon includes a vertical slit along a vertical load line tape in the envelope and extending from one horizontal load line tape to another. A flap on each side of the slit extends the length of the slit and beyond on the inside of the balloon envelope, the depth of the flap being greater at the center of the slit than at the ends. When the slit is closed, the two flaps are contiguous and tend to extend from the edges of the slit toward the vertical axis of the balloon. The greater air pressure inside the balloon tends to hold the flaps together and opposes any tendency of the slit to open due to the existence of some horizontal stresses in the balloon envelope at the location of the slit or due to the weight of control or spreader lines attached to the edges of the slit for opening the slit.

In a preferred embodiment, the flaps are crescent shaped, the outside of the crescent being defined by the curvature of the balloon envelope at the slit. The lines for spreading the slit to release air from the balloon connect to the flaps. The crescent shape of the flaps tends to insure that the flaps extend somewhat taut inside the balloon toward the vertical axis of the balloon envelope. The two flaps each taut from end to end define a continuous closure without wrinkles or folds held together by the greater pressure inside the balloon which opposes any tendency of the flaps to come apart due to horizontal stresses in the envelope at the slit.

Another feature of the improved maneuvering valve for a hot air balloon in the present invention provides a strap on the outside of the balloon envelope across the slit. Where the slit is vertical, the strap is horizontal and attaches at each end equal distances from the slit to the outside of the balloon envelope, preferably along a horizontal load line tape. This strap has a tendency to prevent stresses which are introduced when the slit is spread to release hot air from the balloon from extending beyond the location of the strap. The strap, in effect, continues the load line tape maintaining the load line continues around the circumference of the balloon envelope in spite of the slit which cuts across the load line. Thus, the tape maintains the integrity of the load lines interrupted by the slit and that integrity is maintained while the slit is opened or closed.

It is a further object of the present invention to provide an improved slit type maneuvering valve for a hot air balloon whereby the natural, vertical and horizontal load lines in the balloon envelope are maintained substantially as though the slit were not present.

It is another object of the present invention to provide a slit type maneuvering valve for a hot air balloon for expelling a portion of the hot air from within the balloon and wherein the valve slit opening automatically closes when released and is unlikely to open during flight.

It is a further object in conjunction with the above object to provide such a slit type maneuvering valve which does not substantially alter the horizontal or vertical load lines in the balloon envelope when the slit is closed or when it is opened.

These and other objects and features of the present invention will be more apparent in view of the specific descriptions of embodiments of the invention which represent the best known uses and applications of the invention all taken in conjunction with the figures described below.

DESCRIPTION OF THE DRAWINGS

FIG. 1 is a side elevation view schematically illustrating a hot air balloon in flight and equipped with a maneuvering valve incorporating features of the present invention, the valve being shown closed;

FIG. 2 is an elevational view of the same balloon showing the valve opened to expel air from inside the balloon envelope to render the balloon less buoyant and so descend;

FIG. 3 is an enlarged side section view taken through the balloon envelope at the maneuvering valve to show the crescent shape of the valve slit flaps;

FIGS. 4 and 5 are enlarged views of the maneuvering valve from inside the balloon envelope looking toward the valve and showing the valve closed and opened respectively; FIGS. 1 and 2 illustrate a hot air balloon substantially inflated as when in flight. The balloon envelope 10 is filled with hot air and is rounder at the upper end 11 and tapers at the lower end 12 to an opening 13. At the lower end are attached the load lines 14 which may be substantially uniformly spaced about the circumference of the lower end. They are gathered into two groups that lead to suspension points 15 and 16 laterally separated. The suspension points connects to the balloon load apparatus which includes a basket 17 for the rider or pilot 18, a burner 19 for heating entrained air that fills the balloon envelope and fuel tanks 21. In operation, the pilot controls the burner to maintain the balloon aloft at the desired altitude. Descent in flight is controlled by reducing the rate of gas combustion by the burner. Rapid descent is accomplished by opening the maneuvering valve slit 22 in the balloon envelope to expel hot air from inside the balloon.

Figure 5:
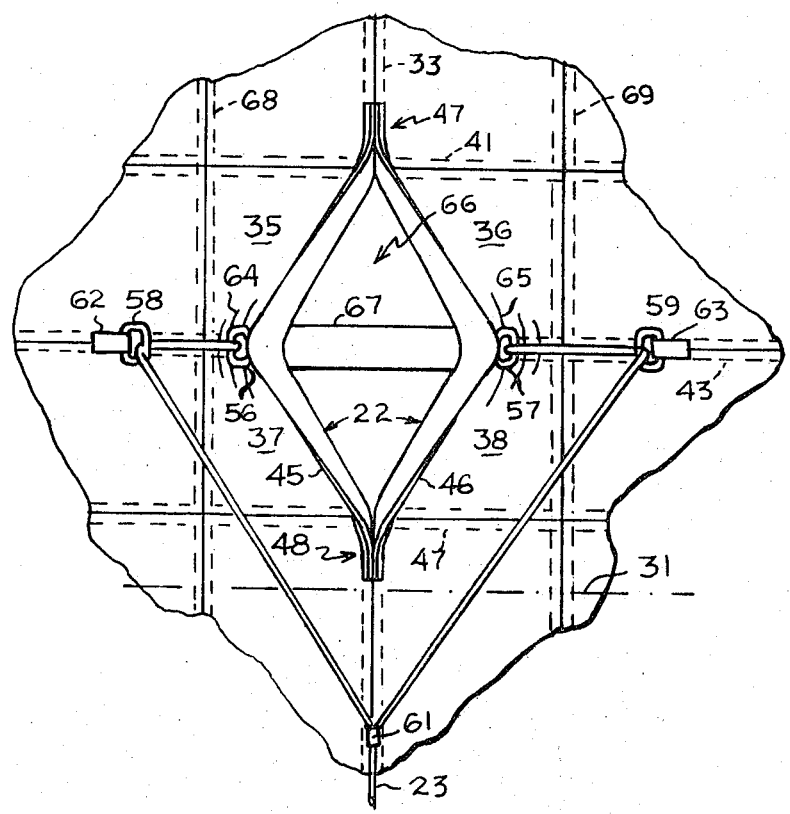
Figure 6:
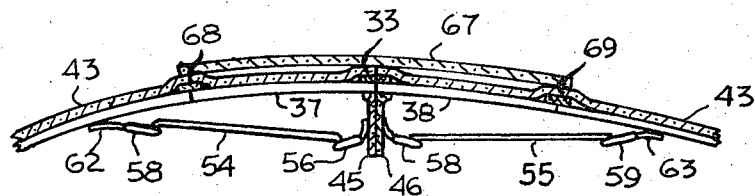
FIGS. 6 and 7 are top sectional views taken through the balloon envelope showing the maneuvering valve closed and opened, respectively.

The maneuvering envelope slit is shown closed in FIG. 1 and opened in FIG. 2. The maneuvering valve slit is controlled by a control line 23 that extends inside the balloon from the maneuvering slit to the pilot. In typical operation, ascent and descent in flight are controlled by the operation of the burner. The maneuvering valve is employed particularly to descend rapidly as when landing. Typically, the pilot descends by control of the burner to within a hundred feet or so of the landing site. When the balloon is thus maneuvered over the landing site, the maneuvering valve slit 22 is suddenly opened by the pilot and the balloon system descends rapidly to the landing site. By this example, it is seen, the primary maneuvering use of the slit is to descend rapidly as when landing or during an emergency.

The balloon envelope 10 may be formed of suitable light weight material which may be cut in gore sections such as 25 that are joined to each other along their edges by seams to form the complete balloon envelope. The light weight material may be nylon ripstop or thin plastic such as polyethylene on the order of a few mils thick. Where the material is polyethylene it is preferably laminated to a relatively stronger material such as woven nylon. The gore sheets may be joined together at the horizontal and vertical load line tapes such as 27 and 28, respectively. A vertical line of these sheets such as sheets 25 and 26 form a gore segment of the balloon envelope.

The gore segments form the complete balloon envelope with a natural shape such that there is substantially an absence of horizontal stresses even above the equator line 31 of the balloon envelope when it is filled out for flight. Thus, the maneuvering slit 22 tends to remain closed until the slit is forceably drawn apart by the pilot through his control of the maneuvering slit via control line 23. Vertical stresses in the balloon envelope at the area of the slit have no tendency to cause the slit to open and in fact tend to inhibit opening of the slit. In practice, however, there are some horizontal stresses in the envelope at the slit and so the slit by itself, does not effectively seal at all flight conditions. This problem is substantially overcome employing the slit type maneuvering valve structure described hereinbelow.

FIGS. 3 to 7 show details of the maneuvering valve as viewed from inside the balloon envelope. The maneuvering valve slit 22 extends along the vertical load line tape 33 that joins four of the gore sections denoted 35 to 38. The slip ends at the horizontal load line tapes 41 and 42 that join these gore sections to the rest of the balloon envelope. The slit cuts across the horizontal load line tape 43 that joins sections 35 and 37 and sections 36 and 38. The crescent shaped flaps 45 and 46 attach along the edges of the slit 22 and extend beyond the slit along the vertical load line tape 33 at 47 and 48. Thus, the outside arc of each crescent shaped flap attaches along the entire length thereof to the inside of the balloon envelope opposite the vertical load line tape 33. The slit 22 may be simply formed in the balloon envelope by either providing a vertical cut in the closed envelope along the vertical load line tape 33, or a section of this tape along the gore sections 35 to 38 may be left out so that these sections are not connected along the slit. In the latter case, the crescent shaped flaps provide a continuation of load line tape 33 across these gore sections.

The horizontal and vertical load line tapes may be attached to the gore sections on the outside and so make up the complete balloon envelope by heat sealing, cementing or by sewing the sections and/or the load line tapes together. Where the load line tape 33 continues along the length of the slit, the tape is split down its length to define the slit and so the tape itself provides reinforcement of edges along the slit.

The slit is preferably located in the balloon envelope so that it is centered above the equator 31 of the envelope and extends a full gore section above and below its center. This slit may extend along more that two of the gore sections depending upon the size of each gore section that makes up the complete envelope. The length of the slit is preferably related to the size of the balloon and so it is related to the balloon volume. The width of the slit when the slit is opened fully by the pilot may be from 1/5 to 1/3 of the length of the slit and the ratio of the open area of this slit to the volume of the balloon may be from 1 : 2,000 to 1 : 500. As shown herein, the slit extends along the edges of two adjacent gore sections and so it crosses one horizontal load line tape (43). Clearly, depending upon the size of the gore sections and the size of the balloon, the slit may extend along more than two gore sections and so cross more than one horizontal load line tape.

Figure 7:
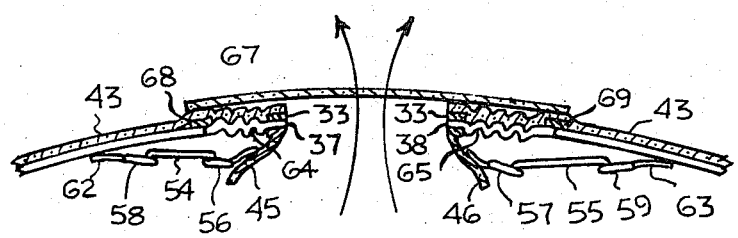

The crescent shape of the flaps 45 and 46 is preferably such that the outside arc 51 of each flap where the flap attaches opposite the vertical load line tape 33 substantially conforms to the shape of the balloon envelope along this line. Furthermore, the inside arc 52 of the crescent is preferably such that the flap extends taut along the line 52. This tends to cause the flap to extend from the balloon envelope radially toward the axis of the balloon and so the flap is at all points along the length thereof perpendicular to the inside surface of the balloon. By virtue of this construction, the two flaps 45 and 46 tend to close together and so are contiguous with each other along substantially the total extending area of each flap. In the closed position, the flaps are held against each other in this manner in part by the greater pressure inside the balloon. For example, as the slit tends to open, the contiguous edges of the flaps along line 51 are exposed to outside or ambient pressure which is of course, slightly lower than the pressure inside the balloon and so the greater inside pressure tends to prevent this separation of the flaps and maintains the maneuvering valve closed. The valve is opened by forceably pulling the flaps apart as shown in FIG. 5 and FIG. 7. The flaps are pulled apart by spreader lines 54 and 55 which are connected at their inner ends to D-rings 56 and 57 attached to flaps 45 and 46, respectively. These D-rings are attached to the crescent shaped flaps at substantially the center thereof as shown in FIG. 3. The spreader lines 54 and 55 extend horizontally away from the flaps 45 and 46 and are threaded through D-shaped eyelets 58 and 59 with the outer ends of the spreader lines extending downwardly and joined at 61 to the valve control line 23 that in turn extends down to the pilot's position as shown in FIG. 1. The eyelets 58 and 59 are preferably attached to the inside of the balloon by tapes 62 and 63 that are secured opposite horizontal load line tape 43. Guide eyelets may be provided for the control line 23 within the balloon if desired. The control line may be held by eyelets or guides to the side of the opening 13 at the bottom of the balloon above the pilot so that the control line is held out of the way of hot air passing up through the opening 13 from the burner 19.

The maneuvering valve is shown open to expell air from inside the balloon in FIGS. 5 and 7. It is opened by the pilot who pulls upon the control line 23 which draws the flaps 45 and 46 apart separating the slit as shown. This action may cause some rippling or folding of the balloon envelope as at 64 and 65 immediately adjacent the flaps. The maximum area of the opening 66 may be limited by limiting the length of play of the control line 23. For example, stops may be provided along the control line 23 which limit the length of play. As already mentioned, the maximum area 66 of the opened slit preferably bears a relationship to the total volume of the balloon in the ratio range from 1:2,000 to 1:500. Another technique for limiting the opening of the slit is to provide a strap connecting the D-rings 56 and 57 inside the balloon such that the length of the strap limits the separation of these D-rings and so limits the opening of the slit.

In as much as the horizontal load line tape 43 is not continuous around the circumference of the balloon, because it is cut by the slit, the effectiveness of this tape in maintaining the integrity of the balloon shape is somewhat lost. This can be regained by attaching a strap 67 on the outside of the balloon envelope joining the disconnected ends of the horizontal load line tape 43, preferably at points along that tape equally distant from the slit and lying between the slit and the points of attachment of the eyelets 58 and 59. For example, the strap 67 may connect with horizontal tape 43 at the crossing of the vertical load line tapes 68 and 69 on each side of vertical tape 33.

The vertical slit type maneuvering valve centered above the equator of the balloon envelope is preferred, because hot air is effectively expelled from this area of the envelope and horizontal stresses in this area of the envelope are likely to be very small. where these stresses, transverse to the slit are small, there is little liklihood of the slit opening except when intentionally opened by the pilot. While the vertical slit centered above the equator is preferred, the opening could be accomplished with a horizontal slit above the equator equipped with the inward extending flaps just as already described herein with respect to the vertical slit 22. The flaps on such a horizontal slit would function just as already described, making use of the greater pressure within the balloon to oppose any tendency of the flaps to come apart due to longitudinal stresses in the balloon envelope at the horizontal slit. In the event that the flaps do not seal the horizontal slit, springs or elastic cords could be provided across such a horizontal slit providing closure forces, sufficient to oppose the vertical stresses. The location of a horizontal slit is preferably at or above the equator 31. At the top of the balloon, of course, horizontal and vertical are the same and whatever stresses exist in the balloon envelope tending to open a slit at the top of the balloon, could be substantially opposed by the use of flaps with or without the additional support of springs or elastic cords across the slit.

The various embodiments of the present invention described herein for a slit type maneuvering valve in a hot air balloon all provide inwardly extending flaps on each side of the slit and as part of these embodiments a preferred configuration of the flaps is described. It should be clearly understood that other configurations of the flaps functioning substantially as the flaps function herein with other mechanisms for spreading the flaps could be substituted without deviating from the spirit and scope of the present invention as set forth in the appended claims.

What is claimed is:

1. In a hot air balloon including a balloon envelope of light weight material and load carrying means at the lower end of the balloon, a buoyancy life control, including a slit in the envelope material, the slit having substantially straight edges which are substantially together when the slit is closed and separated when the slit is opened, comprising, a flap on each side of the slit extending the length thereof on the inside of the balloon envelope, the flaps being substantially contiguous to each other when the slit is closed each flap being a piece of flexible sheet of length and width, each flap extending from the slit inwardly toward the center of the balloon envelope, and each flap being of substantial width at at least the portion thereof central between the ends of the slit in order that a substantial area of the flaps are contiguous when the slit is closed and gas discharging through the slit from inside the balloon tends to force the flaps together, and means for spreading the slit and holding the flaps open for the escape of the air from the balloon envelope.

2. A buoyancy lift control as in claim 1 wherein, the spreader means attaches to said flaps.

3. A buoyancy lift control as in claim 1 wherein, the slit is substantially vertical in the envelope and the balloon envelope has a natural shape with an absence of horizontal stresses at the location of the slit, whereby the flaps of the slit tend to remain closed except when separated by the spreader means.

4. A buoyancy lift control as in claim 3 wherein, the vertical slit is located substantially above the balloon equator.

5. A buoyancy lift control as in claim 3 wherein, the balloon envelope includes vertical and horizontal load line tapes and the slit is along a vertical load line tape.

6. A buoyancy lift control as in claim 5 wherein, the slit terminates at each end at a different horizontal load line tape.

7. A buoyancy lift control as in claim 1 wherein, the flaps each extend beyond the ends of the slit.

8. A buoyancy lift control as in claim 6 wherein, each of the flaps extend beyond the ends of the slit along the same vertical load line tape.

9. A buoyancy lift control as in claim 1 wherein, the spreader means includes first and second spreader lines secured at their inner ends each to a different one of said flaps and extending away from the flaps, eyelets for said spreader lines are secured to the inner surface of the balloon envelope and the spreader lines feed through said eyelets and are joined together, and an operating line is provided connected to the joinder of said spreader lines and extending downward within the balloon to the load carrying means at the lower end of the balloon.

10. A buoyancy lift control as in claim 9 wherein, the balloon envelope includes a multitude of spaced vertical and horizontal load line tapes, the slit is a line with a vertical load line tape, the ends of the slit terminate at horizontal load line tapes, and the eyelets are located along another horizontal load line tape.

11. A buoyancy lift control as in claim 1 wherein, the flaps are crescent shaped.

12. A buoyancy lift control as in claim 1 and further including, a fixed strap across the slit on the outside of the balloon envelope.

13. A bouyancy lift control as in claim 1, wherein a strap is provided across substantially the center of the slit attached at the ends thereof to the balloon envelope at points of attachment beyond the maximum opening of the slit.

14. A buoyancy lift control as in claim 13 wherein, the spreader means includes first and second spreader lines secured at their inner ends each to a different side of said slit and extending away from the slit, eyelets for said spreader lines are secured to the inner surface of the balloon envelope and the spreader lines feed through said eyelets and are joined together, and an operating line is provided connected to the joinder of said spreader lines and extending downward within the balloon to the load carrying means at the lower end of the balloon, and the strap across substantially the center of the slit attached at each end to the balloon envelope at points of attachment between the said eyelets.

* * * * *